(12) United States Patent
Ohori

(10) Patent No.: US 9,005,707 B2
(45) Date of Patent: Apr. 14, 2015

(54) LACQUER PATTERN PRODUCTION METHOD, LACQUER PATTERN FORMED BY USING THE METHOD, AND LACQUER PATTERN DISPLAY METHOD

(75) Inventor: Kazuko Ohori, Machida (JP)

(73) Assignee: Duco Co., Ltd., Tokyo (JP)

( * ) Notice: Subject to any disclaimer, the term of this patent is extended or adjusted under 35 U.S.C. 154(b) by 1029 days.

(21) Appl. No.: 13/056,886

(22) PCT Filed: Apr. 27, 2010

(86) PCT No.: PCT/JP2010/057498
§ 371 (c)(1),
(2), (4) Date: Mar. 11, 2011

(87) PCT Pub. No.: WO2010/126061
PCT Pub. Date: Nov. 4, 2010

(65) Prior Publication Data
US 2011/0154701 A1 Jun. 30, 2011

(30) Foreign Application Priority Data

Apr. 30, 2009 (JP) .................................. 2009-110287
Aug. 28, 2009 (JP) .................................. 2009-198053

(51) Int. Cl.
*B05D 5/00* (2006.01)
*C09D 7/12* (2006.01)
*B05D 1/42* (2006.01)
(Continued)

(52) U.S. Cl.
CPC ................ *C09D 7/1233* (2013.01); *B05D 1/42* (2013.01); *B05D 5/062* (2013.01); *B44C 1/00* (2013.01); *B44C 1/14* (2013.01); *B44F 1/06* (2013.01); *C09D 5/28* (2013.01); *C09D 189/00* (2013.01); *B05D 3/107* (2013.01); *C08K 5/05* (2013.01)

(58) Field of Classification Search
None
See application file for complete search history.

(56) References Cited

U.S. PATENT DOCUMENTS 2,714,560 A * 8/1955 Hookway ...................... 427/257
2005/0121136 A1 * 6/2005 Valmassoi ..................... 156/241

FOREIGN PATENT DOCUMENTS

EP 687580 A2 * 12/1995
JP 02-265678 A 10/1990
(Continued)

OTHER PUBLICATIONS

OxfordDictionaries.com, retrieved from http://www.oxford-dictionaries.com/us/definition/american_english-thesaurus/glaze?q=glaze and http://www.oxforddictionaries.com/us/definition/american_english-thesaurus/lacquer on Jun. 13, 2014.*
Thesaurus.com, retrieved from http://thesaurus.com/browse/glaze and http://thesaurus.com/browse/lacquer on Jun. 13, 2014.*

*Primary Examiner* — Timothy Meeks
*Assistant Examiner* — Michael P Rodriguez
(74) *Attorney, Agent, or Firm* — Harness, Dickey & Pierce

(57) ABSTRACT

In order to achieve an object of applying easily producible and variable patterns effectively and in widely varying ways, lacquer is applied to a decoration target material (1) comprising a transparent or translucent glass or resin material to form a lacquer layer (3), and thereafter an alcohol agent is mixed into the undried lacquer layer (3) to make the lacquer material flow and to form lacquer patterns (3*a*, 3*b*) using the flow behavior of the lacquer, or a crack pattern is formed on, for example, a foil layer (7), thereby to significantly reduce the drying time of the lacquer layer (3), and to suitably form a lacquer pattern comprising a flowing lacquer pattern, a lacquer crack pattern, and a foil crack pattern.

7 Claims, 3 Drawing Sheets

(51) Int. Cl.
*B05D 5/06* (2006.01)
*B44C 1/00* (2006.01)
*B44C 1/14* (2006.01)
*B44F 1/06* (2006.01)
*C09D 5/28* (2006.01)
*C09D 189/00* (2006.01)
*B05D 3/10* (2006.01)
*C08K 5/05* (2006.01)

(56) References Cited

FOREIGN PATENT DOCUMENTS

| | | |
|---|---|---|
| JP | 04292367 A | 10/1992 |
| JP | 10194782 A | 7/1998 |
| JP | 2002225499 A | 8/2002 |
| JP | 2008255292 A | 10/2008 |
| JP | 2008260259 A | 10/2008 |

\* cited by examiner

LACQUER PATTERN PRODUCTION METHOD, LACQUER PATTERN FORMED BY USING THE METHOD, AND LACQUER PATTERN DISPLAY METHOD

TECHNICAL FIELD

The present invention relates to a lacquer (Urushi) pattern production method comprising applying lacquer to a decoration target material to form a pattern on a lacquer layer, the lacquer pattern formed using the method, and a lacquer pattern display method.

BACKGROUND ART

Japanese lacquer (Urushi) painting, which has been traditionally applied on the surfaces of tableware and ornaments, generally involves repeating several times a step of applying lacquer so carefully as to obtain a uniform and flat surface. A drying step following the painting step also commonly is repeated many times and takes a long time.

Patent Literature 1: Japanese Unexamined Patent Application Publication No. 2008-255292
Patent Literature 2: Japanese Unexamined Patent Application Publication No. 2002-225499
Patent Literature 3: Japanese Unexamined Patent Application Publication No. H10-194782

As described above, however, lacquer painting has problems in that it takes a long time and that it can only produce a uniform and flat surface, which means little variation in patterns can be made in other ways than decorating with gold/silver lacquer.

It is accordingly an object of the present invention to provide a lacquer pattern production method that enables easily producible and variable patterns to be applied efficiently and in widely varying ways, the lacquer pattern formed using the method, and a lacquer pattern display method.

DISCLOSURE OF INVENTION

In order to achieve the object mentioned above, according to one embodiment of the present invention, there is provided a structure comprising: a first step of applying lacquer to a decoration target material to form a lacquer layer; a second step of mixing an alcohol agent into an appropriate area of the lacquer layer while the lacquer layer is not dry yet; a third step of forming a flowing lacquer pattern using the flow behavior of the lacquer in the area with the alcohol agent mixed in; and a fourth step of drying the whole lacquer layer having the formed flowing lacquer pattern.

In the method according to this embodiment of the present invention having such a structure, lacquer is applied to a decoration target material, and thereafter an alcohol agent is mixed into an undried lacquer layer to make the lacquer flow and to form a flowing lacquer pattern using the flow behavior of the lacquer; and therefore the lacquer pattern is suitably formed using the flow behavior of the lacquer. In addition, the pattern is formed before the lacquer layer is dried, thereby significantly reducing the operating time.

The alcohol agent according to the present invention preferably contains an ethanol component.

According to the present invention having such a structure, the flow behavior of lacquer can be favorably obtained.

The flowing lacquer pattern according to the present invention can comprise a light and dark pattern of the lacquer or a swollen pattern formed at the flowing edge of the area where the lacquer flows.

According to the present invention having such a structure, a three-dimensional lacquer pattern can be easily obtained by the swollen lacquer pattern.

Further, a protein-containing drying agent may be mixed into the undried lacquer layer according to the present invention to form a crack pattern on the lacquer layer. The crack size and orientation (direction) of the crack pattern can be adjusted by appropriately adjusting the timing of mixing a drying agent containing protein such as albumen according to the present invention.

According to this embodiment of the present invention having such a structure, the protein and lacquer react with each other to easily form a three-dimensional lacquer pattern with cracks on the lacquer layer which would be otherwise uniform and flat.

Also, according to another embodiment of the present invention, there is provided a structure comprising: a first step of applying lacquer to a decoration target material to form a lacquer layer; a second step of mixing a protein-containing drying agent into the lacquer layer while the lacquer layer is not dry yet, to form a mixed lacquer layer; and a third step of drying the mixed lacquer layer to form a lacquer crack pattern.

According to another embodiment of the present invention having such a structure, the lacquer layer is dried with the protein-containing drying agent mixed with the lacquer, thereby easily forming a lacquer crack pattern with large, natural and three-dimensional lacquer cracks.

In addition, according to another embodiment of the present invention, there is provided a structure comprising: a first step of applying lacquer to a decoration target material to form a lacquer layer; a second step of laminating a metal foil onto the lacquer layer while the lacquer layer is not dry yet, to from a foil layer; and a third step of applying a protein-containing drying agent onto the foil layer and drying the foil layer to form a foil crack pattern.

According to another embodiment of the present invention having such a structure, the foil layer is dried with the protein-containing drying agent mixed with the metal foil, thereby easily forming a foil crack pattern with large, natural and three-dimensional foil cracks.

The decoration target material according to the present invention may be made of transparent or translucent glass or resin material.

According to another embodiment of the present invention having such a structure, a lacquer pattern comprising a flowing lacquer pattern formed using the flow behavior of lacquer, a lacquer crack pattern, and a foil crack pattern looks in widely varying ways depending on the light coming through a decoration target material.

Further, according to another embodiment of the present invention, the flowing lacquer pattern, lacquer crack pattern, or foil crack pattern is preferably formed under appropriately controlled atmospheric temperature or humidity.

According to another embodiment of the present invention having such a structure, the finished quality of each pattern can be easily controlled in widely varying ways.

Still furthermore, according to another embodiment of the present invention, there is provided a structure of displaying a lacquer pattern by irradiating a lacquer pattern formed using said lacquer pattern production method with light coming from outside.

According to another embodiment of the present invention having such a structure, a lacquer pattern comprising said flowing lacquer pattern, lacquer crack pattern and foil crack pattern looks glossier when irradiated with light, and is favorably merged into light especially when it is irradiated with light from behind the displayed lacquer pattern.

As described above, the present invention utilizes the unique behavior exerted on lacquer when it is applied to a decoration target material and thereafter an alcohol agent, a metal foil, or a protein-containing drying agent is mixed into an undried lacquer layer, to suitably form various lacquer patterns comprising a suitable flowing lacquer pattern, lacquer crack pattern and foil crack pattern, and reduces the drying time of the lacquer layer. Therefore, the present invention produces easily producible and variable patterns in widely varying ways, and inexpensively and significantly improves the usefulness thereof.

BEST MODE FOR CARRYING OUT THE INVENTION

Figure 1:
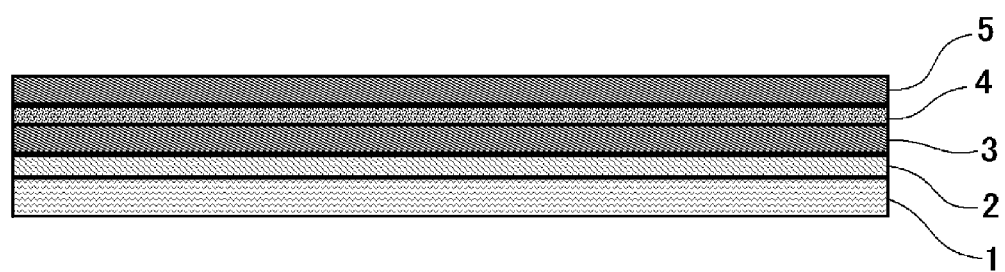
FIG. 1 is an explanatory cross-sectional view schematically illustrating the layer structure of a flowing lacquer pattern formed by a lacquer pattern making method according to an embodiment of the present invention.

A lacquer (Urushi) pattern formed by a lacquer pattern production method according to the present invention has a structure, for example, according to the embodiment shown in FIG. 1. Specifically, according to the embodiment shown in FIG. 1, a transparent or translucent glass or resin material is used as a decoration target material 1 to be subjected to a lacquer pattern. The surface of the material 1 is subjected to a first step of applying lacquer onto a primer 2 comprising an adhesive to form a lacquer (Urushi) layer 3.

While the lacquer layer 3 formed by the first step is not dry yet, an appropriate area of the lacquer layer 3 is subjected to a second step of mixing, for example, an alcohol agent containing ethanol. This causes the lacquer composing of the lacquer layer 3 to flow, and a third step is taken of forming a flowing lacquer pattern using the flow behavior of the lacquer in the area with the alcohol agent mixed in. The alcohol agent for allowing the lacquer to flow, which is highly volatile, has little effect on the coating.

Figure 2:
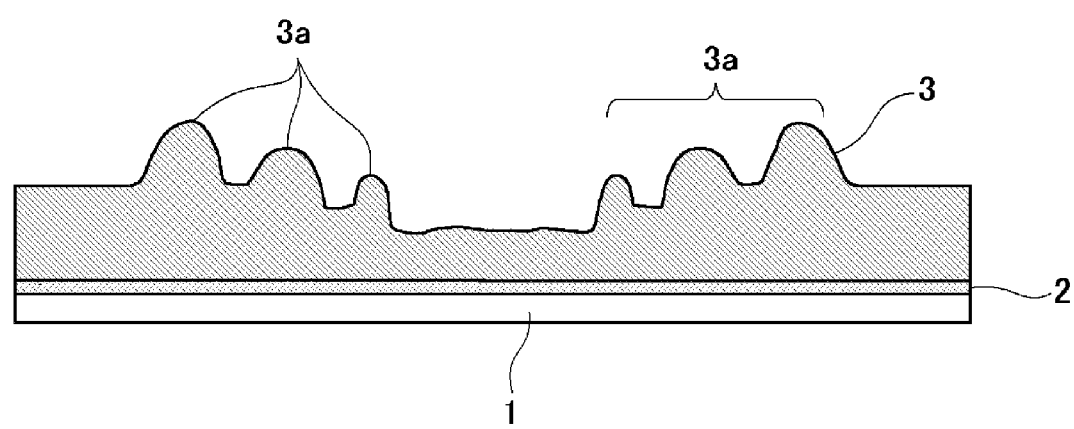
FIG. 2 is an explanatory cross-sectional view schematically illustrating the structure of a light and dark pattern or swollen pattern composing of the flowing lacquer pattern shown in FIG. 1.

The third step produces a flowing lacquer pattern comprising a light and dark pattern or swollen pattern formed at the flowing edge of the area where the lacquer flows. When the third step is repeated, for example, three times, a light and dark pattern with a three-level swollen pattern 3a shown in FIG. 2 is formed as a flowing lacquer pattern. The finished quality of the flowing lacquer pattern can be easily controlled in widely varying ways under appropriately controlled atmospheric temperature or humidity.

Figure 3:
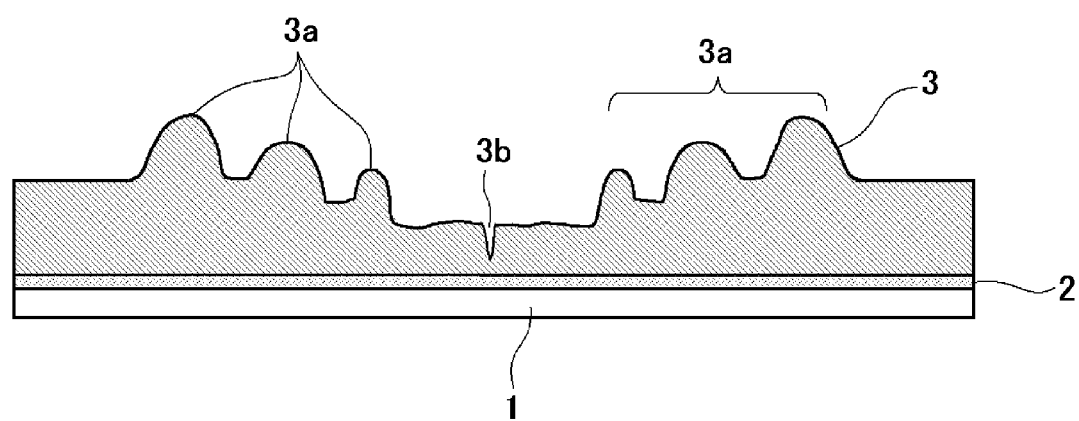
FIG. 3 is an explanatory cross-sectional view schematically illustrating the light and dark pattern or swollen pattern shown in FIG. 2 with a crack pattern.

When the undried lacquer layer 3 composing of the flowing lacquer pattern comprising the light and dark pattern or swollen pattern formed by the third step is subjected to mixing a drying agent 4 containing protein such as albumen, the protein and lacquer react with each other to form a crack pattern 3b on the lacquer layer 3 as shown in FIG. 3. The crack size of the crack pattern 3b can be adjusted by appropriately adjusting the timing of mixing the drying agent.

A variety of crack patterns can be formed by applying the drying agent 4 containing protein such as albumen several times at predetermined intervals. This step of applying the drying agent 4 such as albumen does not require any conventional cleansing or polishing step, thus not significantly increasing the processing time.

After the lacquer layer 5 is formed, a fourth step is taken of drying the whole lacquer layer 3 having the above-mentioned flowing lacquer pattern, to complete the steps.

According to another embodiment of the present invention having such a structure, lacquer is applied to the decoration target material 1, and thereafter the alcohol agent is mixed into the undried lacquer layer 3 to make the lacquer flow and to form a flowing lacquer pattern using the flow behavior of the lacquer; thereby significantly reducing the drying time of the lacquer layer 3 and allowing a flowing pattern to be suitably formed using the flow behavior of the lacquer.

According to this embodiment, the alcohol agent contains ethanol, which thereby allows the flow behavior of the lacquer to be favorably obtained with little effect on the coating.

The flowing lacquer pattern according to this embodiment comprises the light and dark pattern of the lacquer or the swollen pattern formed at the flowing edge of the area where the lacquer flows; and therefore a three-dimensional lacquer pattern can be easily obtained.

Also, according to this embodiment, the protein-containing drying agent is mixed into the undried lacquer layer 3 to form a crack pattern on the lacquer layer 3, and the crack size of the crack pattern is adjusted by appropriately adjusting the timing of mixing the drying agent; thereby allowing a three-dimensional lacquer pattern with cracks to be easily formed on the lacquer layer which would be otherwise uniform and flat.

In addition, according to this embodiment, the decoration target material 1 comprises a transparent or translucent glass or resin material; and therefore the flowing lacquer pattern formed using the flow behavior of the lacquer looks in widely varying ways depending on the light coming through the decoration target material 1.

Figure 4:
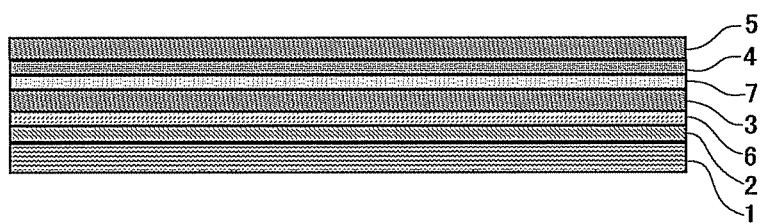
FIG. 4 is an explanatory cross-sectional view schematically illustrating the layer structure of a foil crack pattern formed by a lacquer pattern production method using a metal foil such as gold foil according to another embodiment of the present invention.
Figure 5:
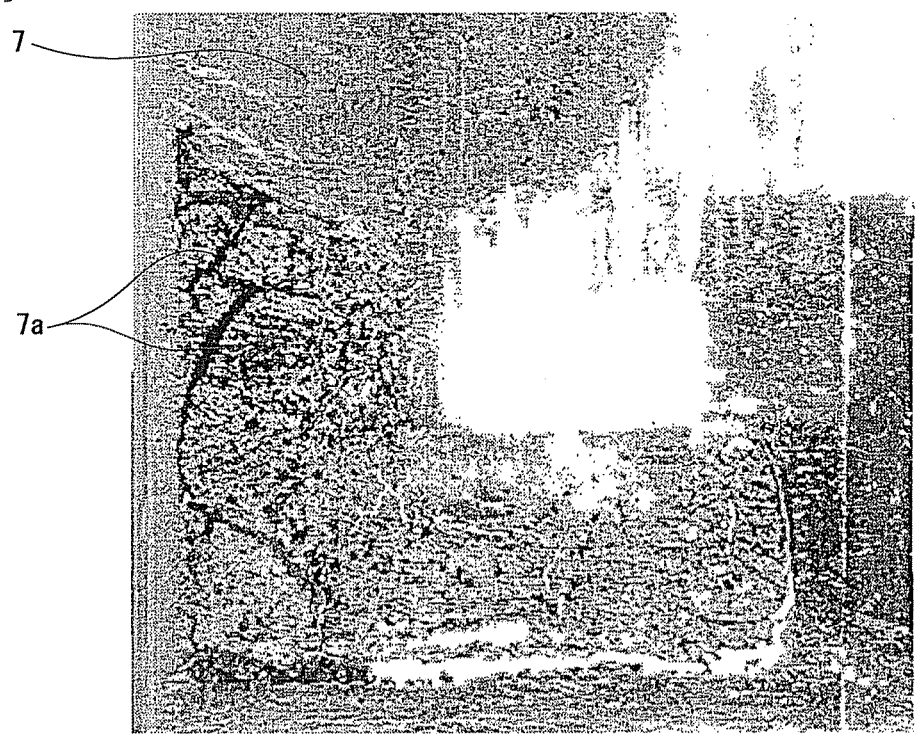
FIG. 5 is an explanatory front view illustrating a cracked foil lacquer pattern according to the embodiment shown in FIG. 4 seen from outside.

An embodiment shown in FIG. 4, where like elements have the same reference numerals as in the above-mentioned embodiment, illustrates a method of using a metal foil such as gold foil to form a foil crack pattern with cracks on a metal foil. This embodiment comprises a step of forming a lacquer layer 3 after an acrylic coating 6 is formed on a primer 2 and laminating a foil layer 7 comprising a metal foil such as gold foil onto an appropriate area on the surface of the lacquer layer 3 while the lacquer layer 3 is not dry yet. This embodiment also comprises a step of applying a drying agent 4 containing protein such as albumen onto the foil layer 7 and drying the foil layer 7. These steps allow the drying of not only the undried lacquer layer 3 but also the foil layer 7 at the same time, thereby to form a foil crack pattern with natural cracks 7a, which are larger than conventional ones, on the gold foil composing of the foil layer 7 as shown in FIG. 5.

According to this embodiment having such a structure, the drying is conducted while the foil layer 7 comprising a gold foil is mixed with the drying agent 4 containing protein such as albumen; and therefore a three-dimensional lacquer foil crack pattern can be easily obtained with natural cracks on the gold foil composing of the metal foil. The finished quality of the foil crack pattern can be easily controlled in widely varying ways under appropriately controlled atmospheric temperature or humidity.

Alternatively, a lacquer crack pattern comprising a crack pattern may be also formed without forming the foil layer 7 comprising a gold foil. Such an embodiment comprises the steps of: applying and mixing a protein-containing drying agent 4 into the undried lacquer layer 3 with the lacquer applied to the decoration target material to form a mixed lacquer layer; and drying the mixed lacquer layer formed in said step to form a lacquer crack pattern.

According to the embodiment having such a structure, the drying is conducted while the drying agent 4 containing protein such as albumen is mixed into the lacquer; and therefore a lacquer crack pattern with three-dimensional and natural cracks which are larger than conventional ones can be easily obtained. The finished quality of the lacquer crack pattern can be also easily controlled in widely varying ways under appropriately controlled atmospheric temperature or humidity.

In addition, a lacquer pattern comprising a flowing lacquer pattern, a lacquer crack pattern, and a foil crack pattern formed by each lacquer pattern production method according to each of the above-mentioned embodiments can be displayed with irradiation of light coming from outside. The display method enables the lacquer pattern to look glossier, thus improving the decorativeness thereof. Especially when the decoration target material 1 comprising a transparent or translucent glass or resin material is irradiated with light from the behind the displayed lacquer pattern, the lacquer pattern is favorably merged into light and is thus much more decorative.

While the present invention, made by the inventor has been specifically illustrated with reference to the embodiments, it should be understood that the present invention is not limited to the above-mentioned embodiments and various modifications can be made without deviating from the sprit of the present invention.

For example, although a transparent or translucent glass or resin material is used as a decoration target material in the embodiments, other various materials such as wood or metal can be also used in a similar manner.

INDUSTRIAL APPLICABILITY

The present invention can be applied to a wide variety of decoration target materials.

REFERENCE NUMERALS

1 Decoration target material (transparent or translucent glass or resin material)
2 Primer
3 Lacquer layer
3*a* Swollen pattern
3*b* Crack pattern
4 Drying agent (albumen)
5 Lacquer layer
6 Acrylic coating
7 Metal foil (gold foil)
7*a* Crack

The invention claimed is:

1. A lacquer pattern production method comprising:
    a first step of applying lacquer to a decoration target material to form a lacquer layer;
    a second step of mixing an alcohol agent into an area of the lacquer layer while the lacquer layer is not dry yet;
    a third step of forming a flowing lacquer pattern using the flow behavior of the lacquer in the area with the alcohol agent mixed in; and
    a fourth step of drying the whole lacquer layer having the formed flowing lacquer pattern;
    wherein a protein-containing drying agent is mixed into the lacquer layer to form a crack pattern on the lacquer layer.

2. The lacquer pattern production method according to claim 1,
    wherein the flowing lacquer pattern comprises a light and dark pattern of the lacquer or a swollen pattern formed at the flowing edge of the area where the lacquer flows.

3. The lacquer pattern production method according to claim 1, wherein a crack size of the crack pattern is adjusted by adjusting the timing of mixing the drying agent.

4. A lacquer pattern production method comprising:
    a first step of applying lacquer to a decoration target material to form a lacquer layer;
    a second step of applying and mixing a protein-containing drying agent into the lacquer layer while the lacquer layer is not dry yet, to form a mixed lacquer layer; and
    a third step of drying the mixed lacquer layer to form a lacquer crack pattern.

5. The lacquer pattern production method according to claim 1,
    wherein the decoration target material comprises one of a transparent glass material, a translucent glass material, a transparent resin material, or a translucent resin material.

6. The lacquer pattern production method of claim 1, wherein the flowing lacquer pattern is formed under controlled atmospheric temperature or humidity.

7. A method of displaying a lacquer pattern comprising:
    producing a lacquer pattern according to the method of claim 1, the lacquer pattern having a front side and a back side; and
    irradiating the lacquer pattern with light from the back side of the pattern.

* * * * *